United States Patent
Atias et al.

(10) Patent No.: US 9,537,946 B2
(45) Date of Patent: Jan. 3, 2017

(54) SYSTEM AND METHOD FOR CREATING AND SHARING USER-GENERATED INFORMATION

(71) Applicants: Joseph Atias, Great Neck, NY (US); Israel Kehat, Hasharon (IS); Kiran Babu Gutta, Hyberadad (IN)

(72) Inventors: Joseph Atias, Great Neck, NY (US); Israel Kehat, Hasharon (IS); Kiran Babu Gutta, Hyberadad (IN)

( * ) Notice: Subject to any disclaimer, the term of this patent is extended or adjusted under 35 U.S.C. 154(b) by 481 days.

(21) Appl. No.: 13/873,210

(22) Filed: Apr. 30, 2013

(65) Prior Publication Data

US 2014/0324967 A1    Oct. 30, 2014

Related U.S. Application Data

(60) Provisional application No. 61/639,948, filed on Apr. 29, 2012.

(51) Int. Cl.
| | |
|---|---|
| *G06F 15/173* | (2006.01) |
| *H04L 29/08* | (2006.01) |
| *H04L 12/58* | (2006.01) |

(52) U.S. Cl.
CPC ............. *H04L 67/104* (2013.01); *H04L 51/08* (2013.01); *H04L 67/02* (2013.01)

(58) Field of Classification Search
CPC .... H04L 67/104; H04L 12/5885; H04L 51/08; G06F 17/30; G06Q 30/02
USPC ......... 709/204, 250, 214, 229, 223; 707/10; 715/230
See application file for complete search history.

(56) References Cited

U.S. PATENT DOCUMENTS

| | | | |
|---|---|---|---|
| 7,730,216 B1* | 6/2010 | Issa et al. ...................... 709/250 |
| 8,285,813 B1* | 10/2012 | Colton ...................... G06F 9/54 709/217 |
| 8,527,860 B1* | 9/2013 | Colton .............. G06F 17/30893 709/203 |
| 2003/0063770 A1* | 4/2003 | Svendsen et al. ............ 382/100 |
| 2007/0208751 A1* | 9/2007 | Cowan ................... G06Q 30/02 |
| 2007/0266342 A1* | 11/2007 | Chang et al. ................. 715/810 |
| 2008/0215623 A1* | 9/2008 | Ramer .............. G06F 17/30749 |
| 2008/0222295 A1* | 9/2008 | Robinson et al. ............ 709/227 |
| 2011/0137986 A1* | 6/2011 | Wolf .............................. 709/204 |
| 2012/0158733 A1* | 6/2012 | McGill et al. ................ 707/741 |
| 2015/0033112 A1* | 1/2015 | Norwood et al. ............ 715/230 |
| 2015/0088668 A1* | 3/2015 | Bruce et al. ............... 705/14.73 |

* cited by examiner

*Primary Examiner* — Frantz Jean

(57) ABSTRACT

Systems and methods for creating and sharing user-generated content that can be tagged to a website or page are provided herein. The systems and methods allow a user to create content and to share it with others via a variety of methods. The content can be shared in context with an underlying webpage or site. Computer readable medium containing executable code for creating and sharing user-generated information are also disclosed.

6 Claims, 14 Drawing Sheets

SYSTEM AND METHOD FOR CREATING AND SHARING USER-GENERATED INFORMATION

CROSS-REFERENCE TO RELATED APPLICATION

This claims benefit of U.S. Provisional Patent Application No. 61/639,948 filed Apr. 29, 2012, the entirety of which is incorporated herein by reference.

BACKGROUND

Field of the Invention

This relates to information systems, computational systems, and data structures. More particularly, this relates to systems and methods for creating and sharing user-generated information via computer networks.

Description of Related Art

The Internet is a repository and communication channel and medium for a plurality of nodes accessed by computing devices for human use. The Internet is a network of networks of such nodes. The Internet, essentially, comprises information. The Internet is a massive corroboration and collaboration of information. This information is typically hosted by means of plurality of websites or web that can be accessed by their unique identity on the Internet which is generally referred to as its URL (uniform resource locator).

Each website or web page comprises pertinent information in relation to what the host intends to display. E.g., a travel website might feature information, pictures, videos, and the like, and data in relation to various geographical locations. Similarly, an encyclopedia page might feature topic-wise data and related explanations; a music website might feature music-genre specific information; and the like. While dynamic data/content can be utilized, most content is static and host-controlled, i.e., a website host selects the data/content to be displayed and may change it from time to time.

Further advances include "crowd-sourced" databases and websites such as Wikipedia where the content can continuously be changed. Users can log-in and change the content along with references on an ad hoc basis. Such changes are logged and changed made by each person are reflected to anyone accessing the page through the Internet.

Snippets of information can be shared for example by copying or pasting either the content, or a URL directing a person to the content. Such sharing is currently enabled through a variety of means including e-mail, social media sharing sites, peer-to-peer networks, messaging modules, and other communication channels. However, such methods of sharing have many limitations. For example, while current sharing methods provides some ability to share online content in a manner such that links to existing online information e.g. by tagging, highlighting, commenting, pinning files, and the like, the ability to do so is quite limited Therefore, there is a need for improved systems and methods that allow creating and sharing content in relation to existing content, by tagging (e.g., identifying, highlighting, commenting upon, adding keywords to, pinning files to, and the like), certain portions of existing websites or web-pages.

SUMMARY OF THE INVENTION

One object herein is to provide systems and methods that allow creating and sharing of user content or user information and tagging such created user content or user information in relation to existing websites or web-pages.

Another object of this disclosure is to provide such systems and methods that function in a stored manner, or in a shared manner.

A further object is to provide systems and methods that allow creating and sharing of user content or user information and tagging such created user content or user information in relation to existing websites or web-pages, which content or information includes text, files, images, multimedia, video, audio, other websites or web-pages, and the like.

Yet another object of this disclosure is to provide systems and methods that allow creating and sharing user content or user information and tagging such created user content or user information in relation to existing websites or web-pages in a privacy controlled shared medium.

An additional object hereof is to provide systems and methods that feature user-specific tools that facilitate creating and sharing user content or user information and tagging such created user content or user information in relation to existing websites or web-pages.

Yet an additional object is to provide systems and methods with user-specific tools in order to allow communication and/or sharing of created user content or user information and communication and/or sharing of the tagging of such created user content or user information in relation to existing websites or web-pages.

One or more of these or other objects are achieved by providing systems and methods herein for creating and sharing user-generated information. The systems and or methods generally comprise one or a plurality of sharing module(s) such as a multi-node, peer-to-peer sharing module. The sharing module(s) preferably comprise one or more windows for accessing, actuating, and using the system and such tools and/or mechanisms as may be useful for accessing, actuating, and using said system.

The systems further comprise a client component, generally including a user-window tool adapted to provide a user (e.g. an authorized or registered user) to create user-generated content. The client user-window tool may further comprise any of a plurality of tabs, mechanisms, selection means, uploading means, tagging means, URL locator, address pointer for various content or information of data or file related activities for providing said user-generated content.

The systems also comprise a server component residing on one or more servers. The servers may be local or remote to the user. The server component preferably comprises replication means adapted to replicate data from a site or page of a selected URL or data from the site or page of an address pointer, as well as remotely located processing means, remotely located data structures (e.g. databases), and the like.

The systems also generally comprise bi-directional communication channel(s) between user-window tools, sharing modules, and server components, said communication being routed through said server component.

Optionally, the system comprises privacy control mechanisms adapted to induce privacy control settings at various levels for the user of the user-window tool. Embedding means adapted to embed information from already existing data on the Internet may be also be included in various embodiments.

The systems may further comprise a Short Message Service ("SMS")-based mobile device-based application ("MBA") adapted to allow a user to share user user-generated content and also to allow a user to generate user-generated content.

An encryption mechanism adapted to include phone identity plus MAC (Media Access Control) identity of each user and to store such information on databases at the server may also be included.

The systems can also comprise link validation mechanism(s) adapted to validate each link associated with content or keyword on a web-page or a website.

Other and further objects, features, and advantages of the present invention will be readily apparent to those skilled in the art.

BRIEF DESCRIPTION OF THE DRAWINGS

FIG. 7 shows a pop-up window that begins the process of creating a new PML. FIG. 8 shows a further pop-up window that allows selection of an image from a variety of sources as part of the creation process. FIG. 9 shows an option for selecting an image from e.g. a library on the local machine. FIG. 10 shows another option for adding an image to the PML for example by dropping and dragging the image into the PML creation pop-up. FIG. 11 shows a preview of a tab on the PML and an option to enter a comment or descriptive text for the viewer. FIG. 12 shows a preview of the PML with both the image and an accompanying comment visible.

DETAILED DESCRIPTION

Definitions

Figure 1:
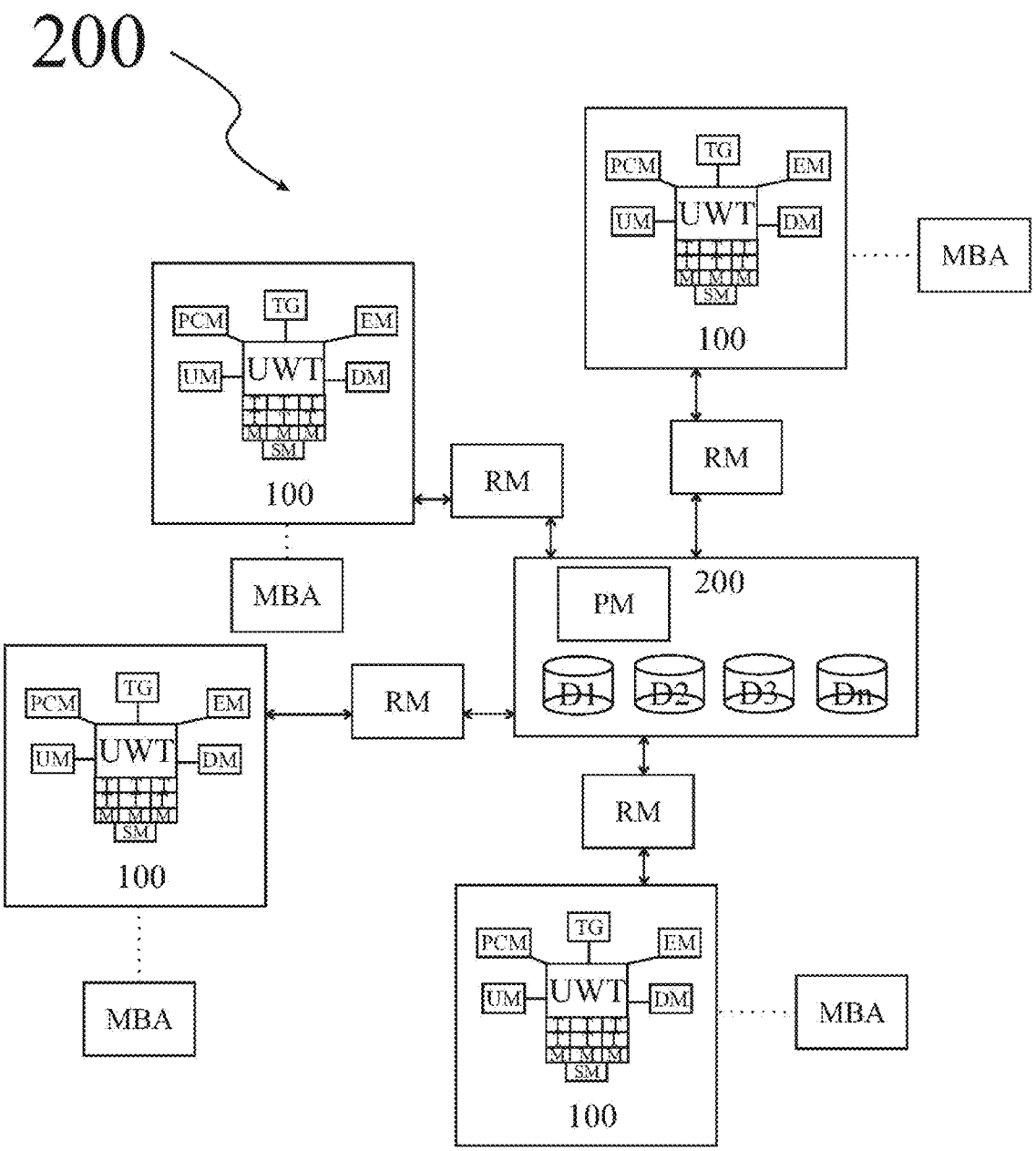
FIG. 1 illustrates a schematic flow chart of one embodiment of the system.
Figure 2:
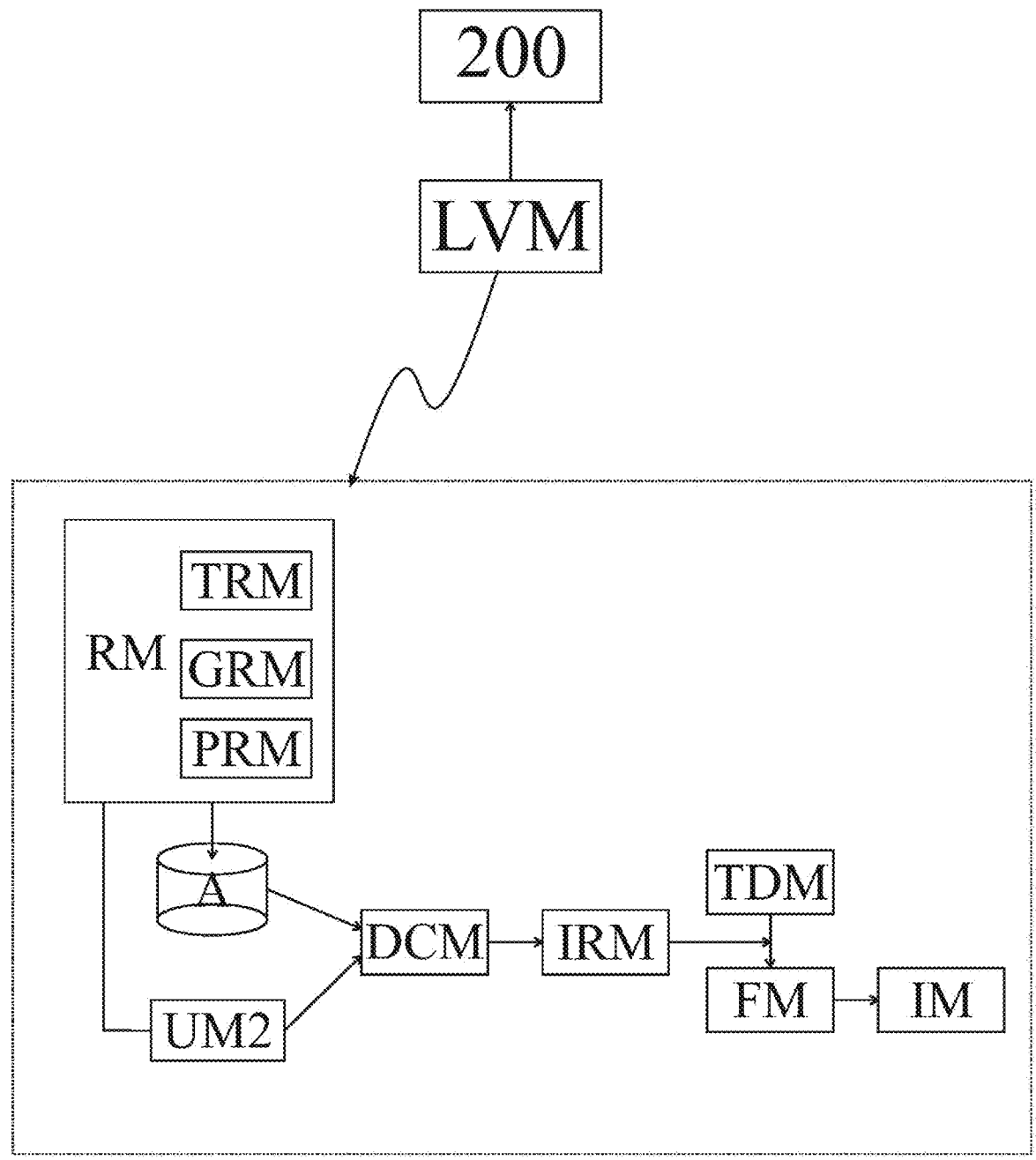
FIG. 2 depicts a flow chart of an embodiment of a link validation mechanism as described herein.
Figure 3:
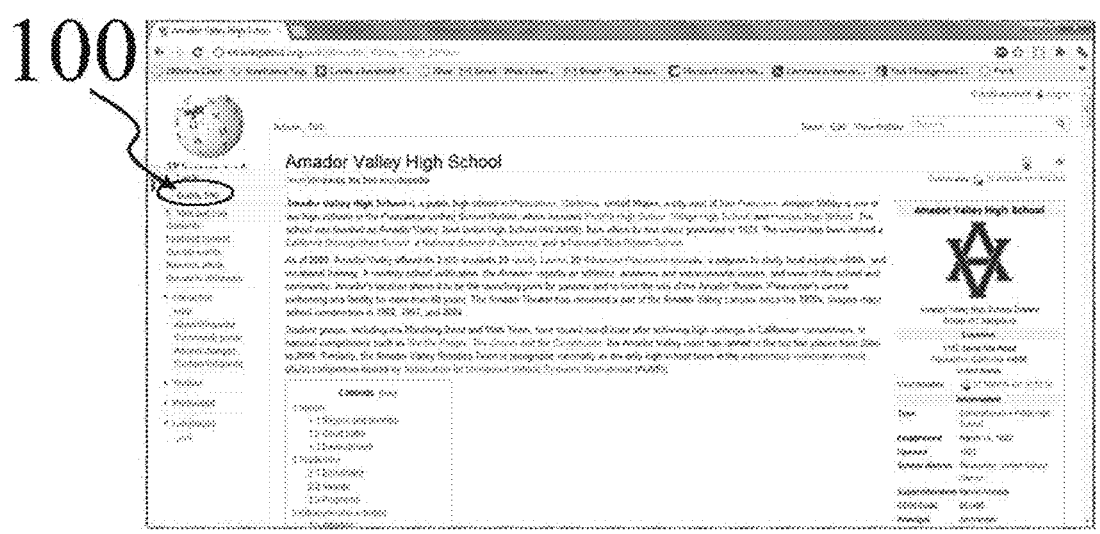
FIG. 3 is a screenshot showing a browser with browser extension embodiment through which the user can enable/implement aspects the system.
Figure 4:
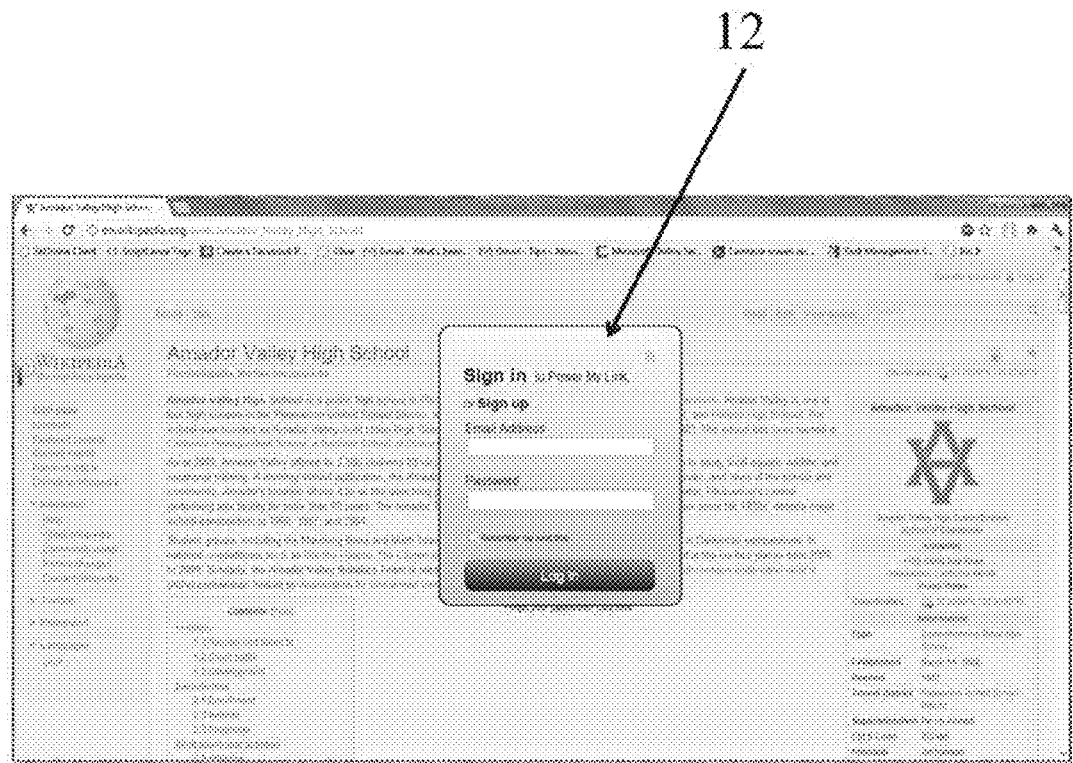
FIG. 4 is a screenshot of a further aspect showing the browser/browser extension providing a user log-in function.
Figure 5:
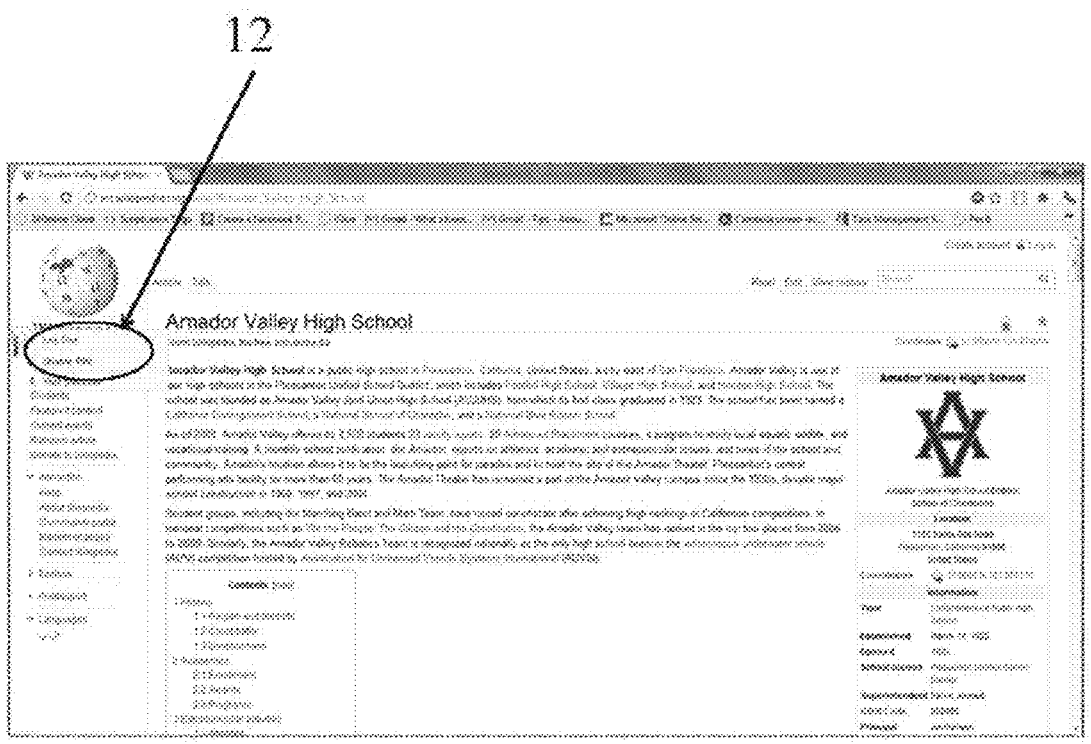
FIG. 5 is a screenshot of another aspect of a browser/browser extension providing user with log-out and disable functions.
Figure 6:
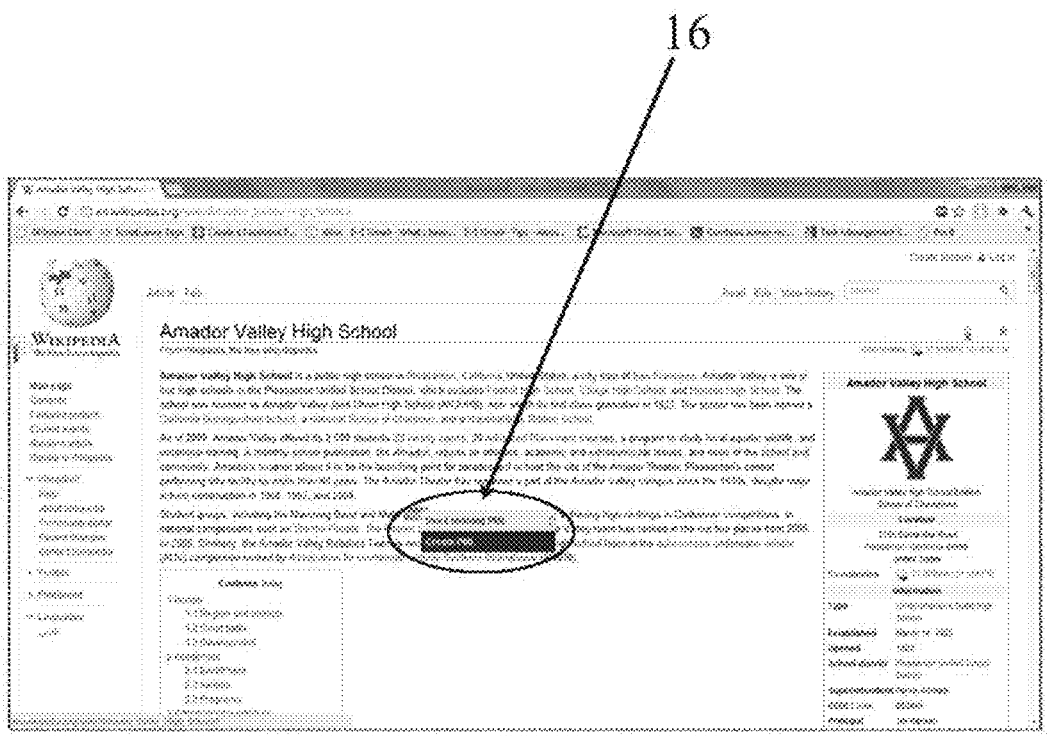
FIG. 6 is a screenshot showing the browser with browser extension installed providing the user with the ability to highlight e.g. a phrase or image on a webpage and associate (or link) an existing PML thereto, or to create a new PML.
Figure 7:
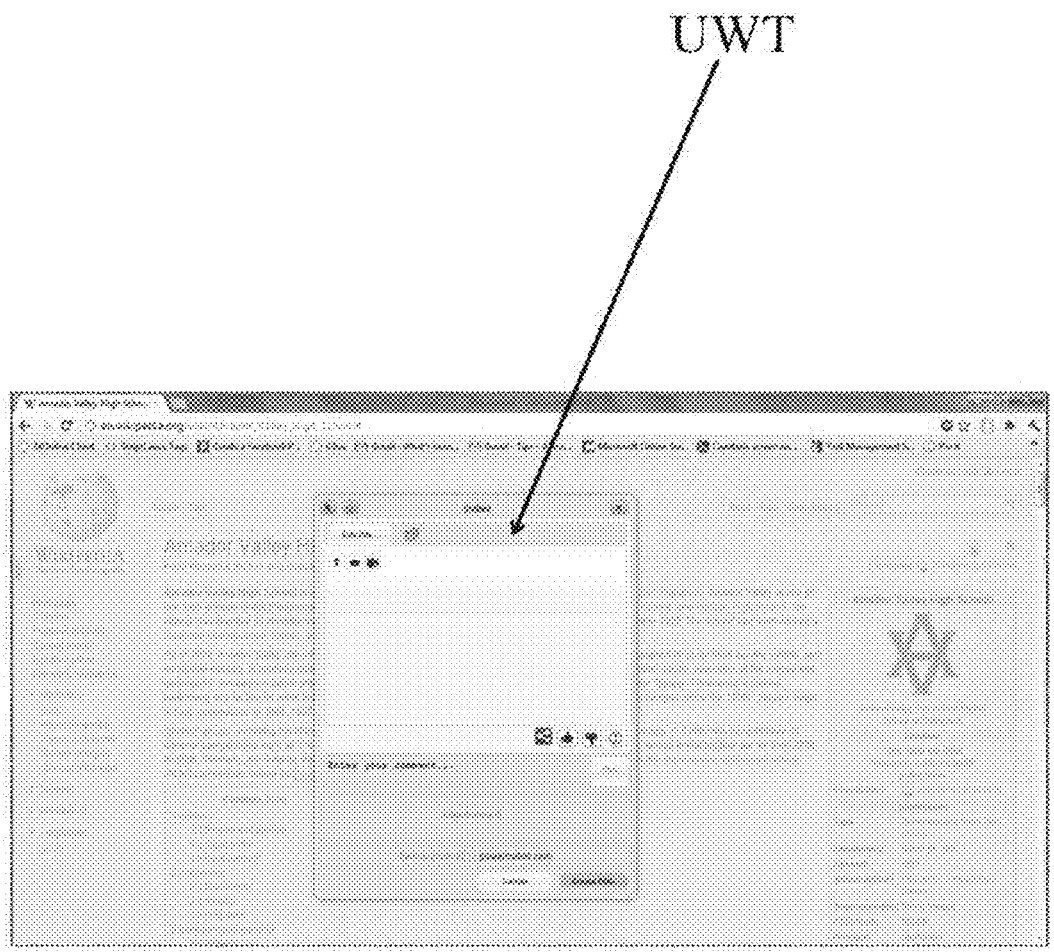
FIGS. 7 to 12 show a series of screenshots of a browser window with browser extension installed in a module for creating a new PML via a pop-up window with a variety of options, each of which provides a subsequent functionality, e.g. via one or more pop-up windows.
Figure 8:
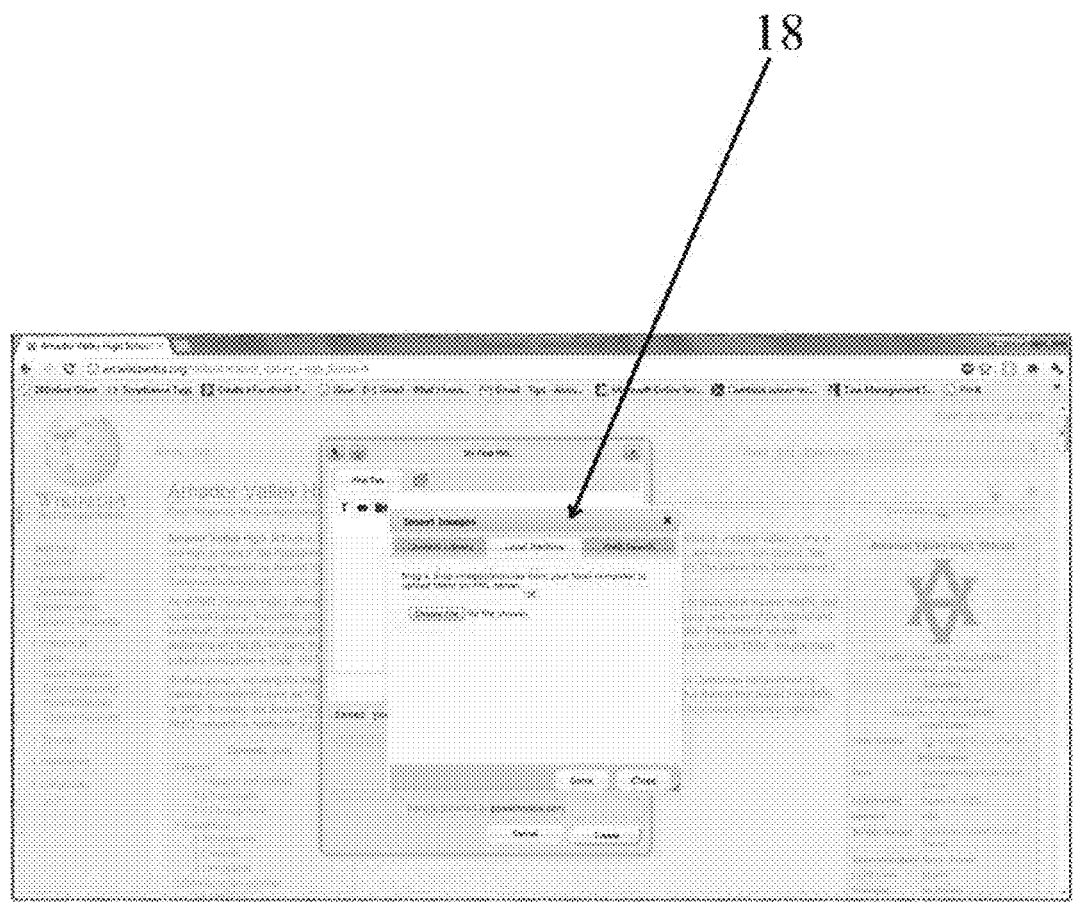
Figure 9:
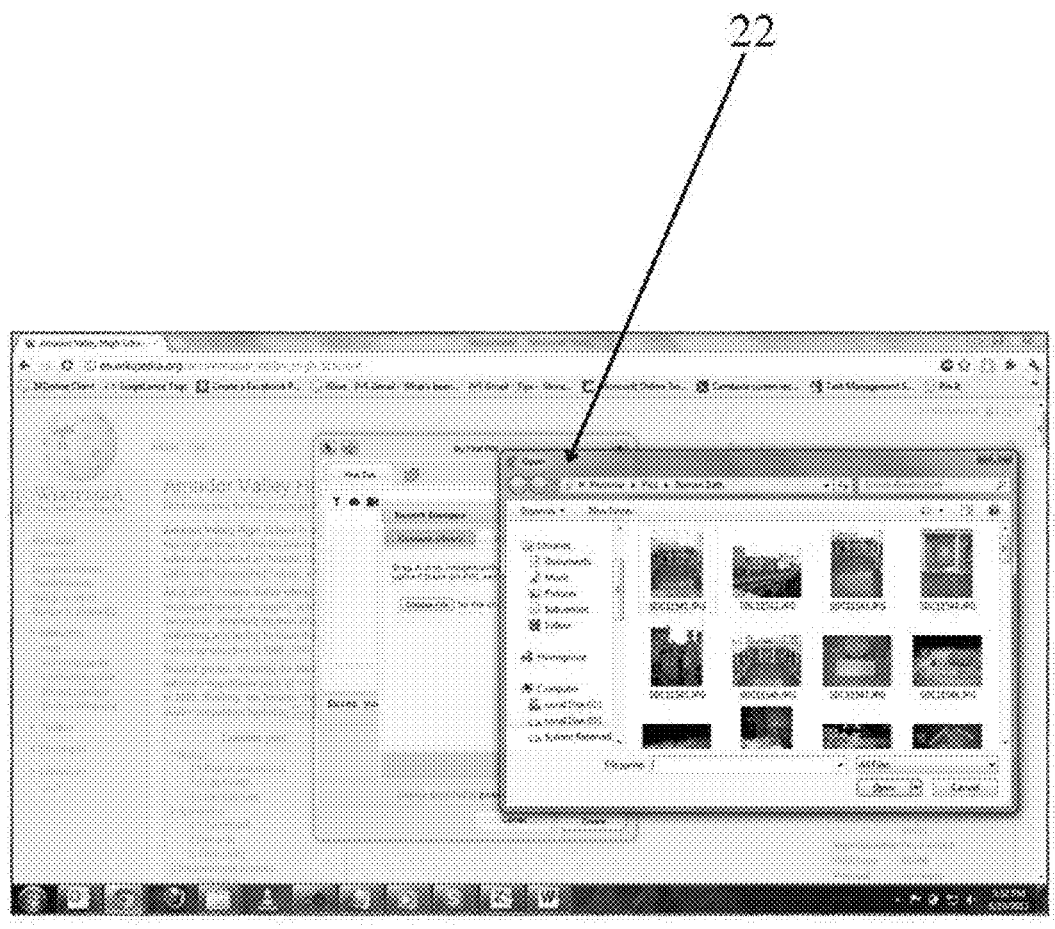
Figure 10:
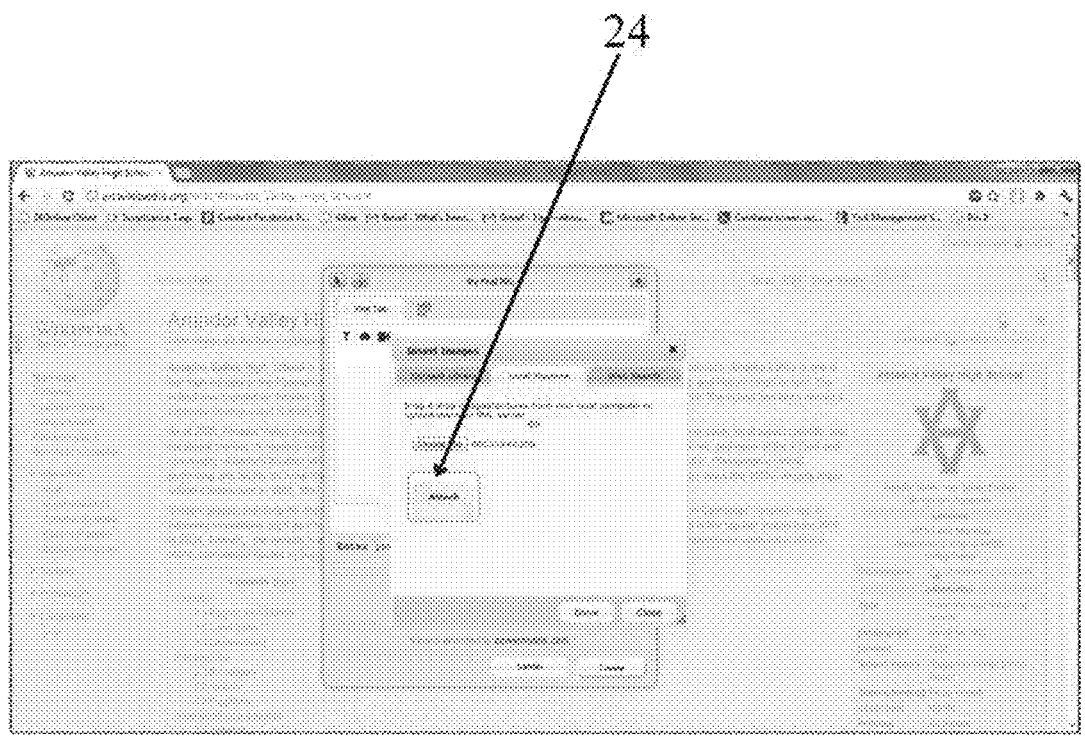
Figure 11:
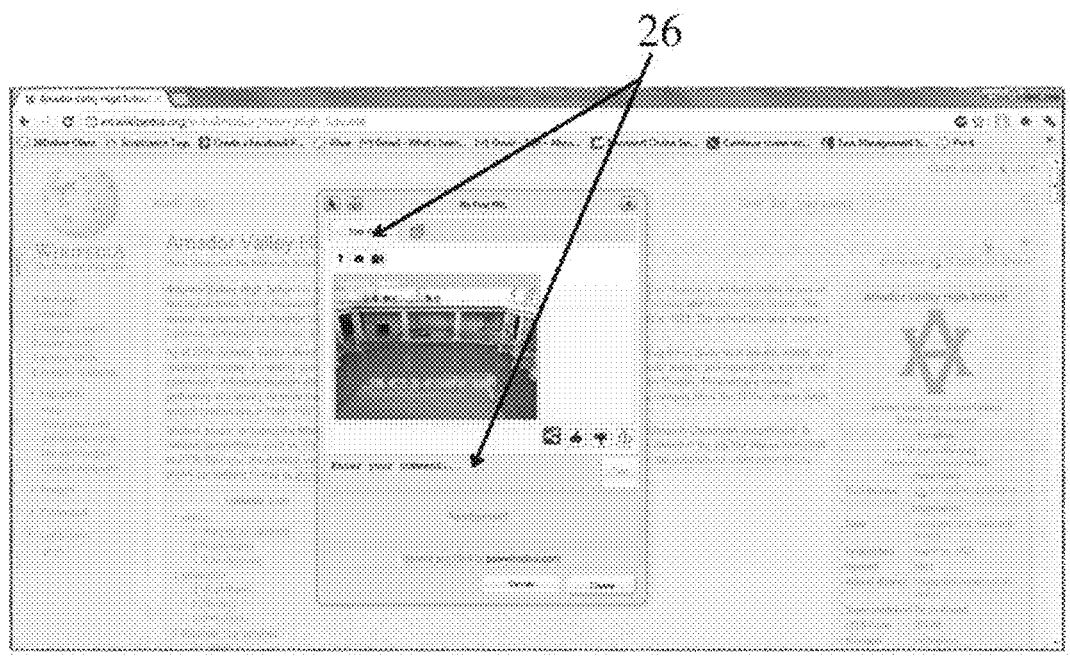
Figure 12:
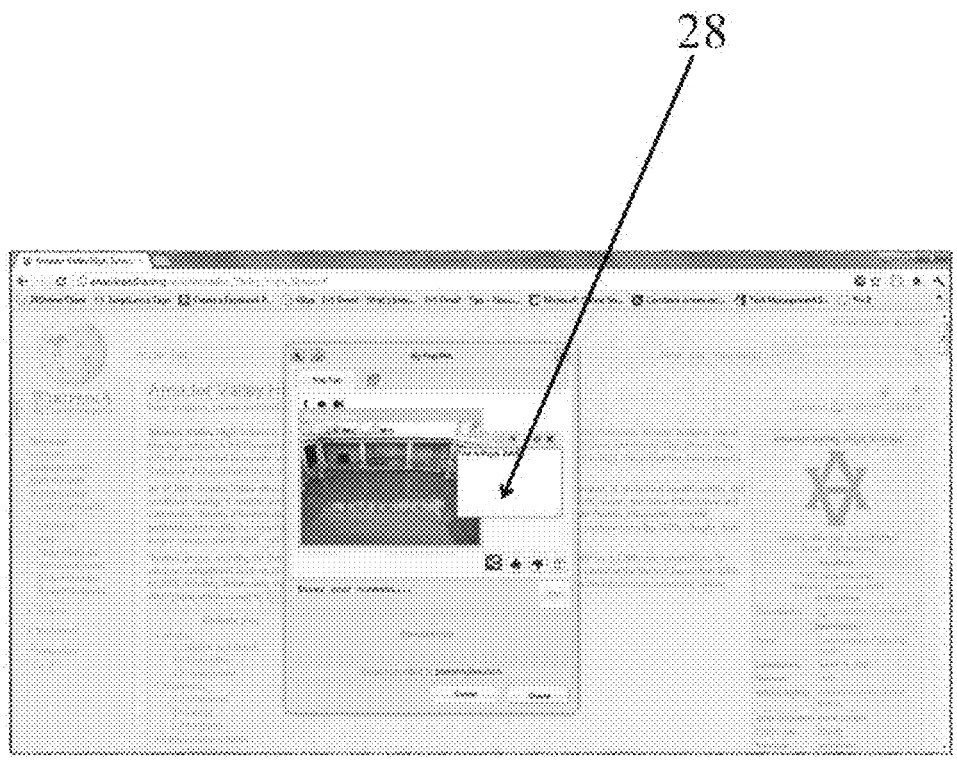
Figure 13:
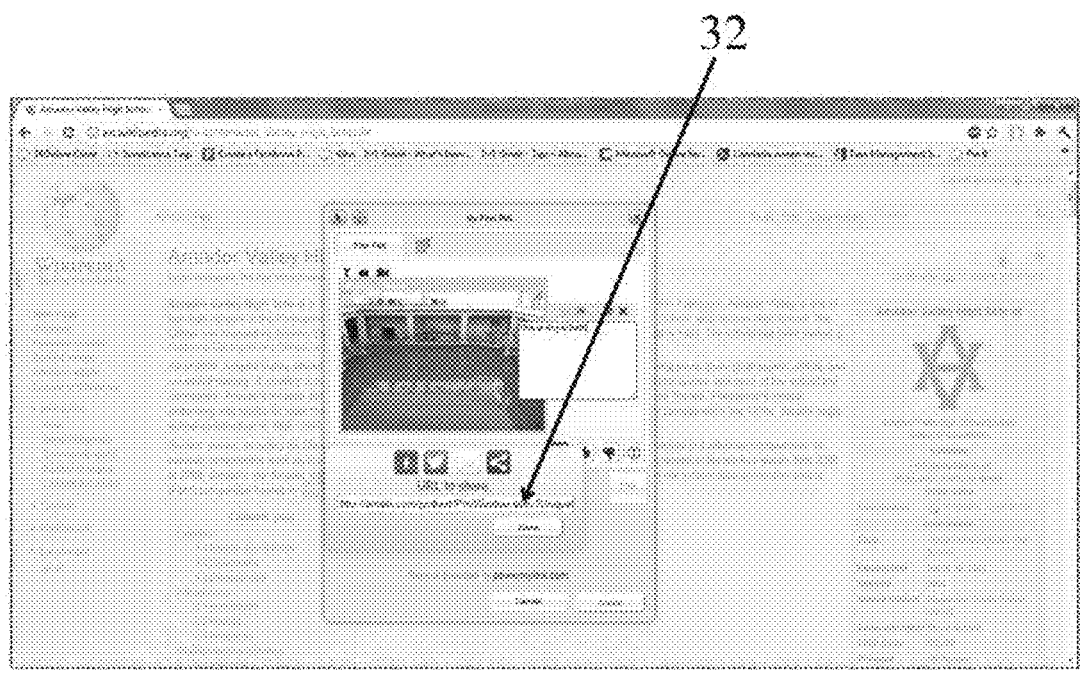
FIG. 13 shows that a URL is created for the PML and a variety of options for sharing the PML via social networks, email, messaging, or other means.
Figure 14:
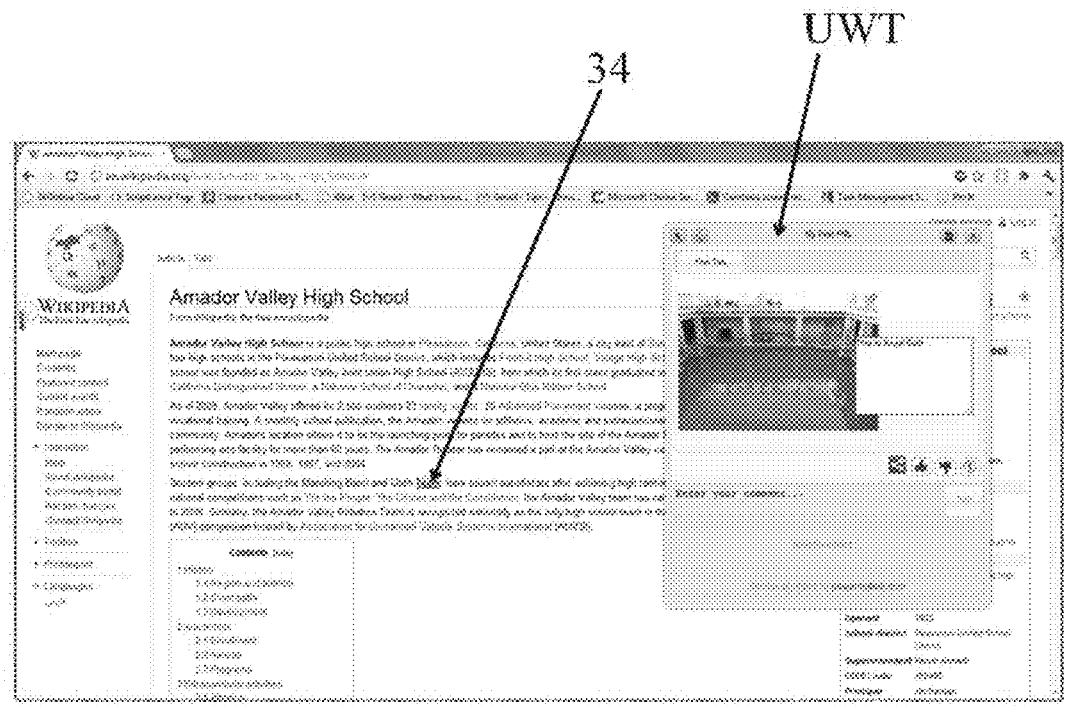
FIG. 14 depicts the browser window showing the underlying webpage with the phrase or image highlighted. The PML is displayed in association with the underlying webpage either upon loading of the webpage (e.g. as an automated pop-up), or upon a user-initiated action, such as mouseover or mouse click. The PML can be displayed in a separate window (as shown).

The term 'encrypt' or 'encryption' means the process of converting digital information into a new form using a key or a code or a program, wherein the new form is unintelligible or indecipherable to a user or a thief or a hacker or a spammer. Encryption thus includes encoding, compressing, or any other translating of the digital content. The encryption of the digital media content is performed in accordance with an encryption/decryption algorithm. The encryption/decryption algorithm utilized is not hardware dependent and may change depending on the digital content. For example, a different algorithm may be utilized for different websites or programs. Encryption may further include one or more aspects of authentication, entitlement, data integrity, access control, confidentiality, segmentation, information control, and combinations thereof.

As used herein, an "article of manufacture" comprises computer readable medium, hardware logic, and/or transmission signals in which code may be implemented.

A "computer readable medium" may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.).

As used herein, ranges are used herein in shorthand, to avoid having to list and describe each and every value within the range. Any appropriate value within the range can be selected, where appropriate, as the upper value, lower value, or the terminus of the range.

As used herein the "network" means a system allowing interaction between two or more electronic devices, and includes any form of inter/intra enterprise environment such as the world wide web, Local Area Network (LAN), Wide Area Network (WAN), Storage Area Network (SAN) or any form of Intranet.

As used herein, the singular form of a word includes the plural, and vice versa, unless the context clearly dictates otherwise. Thus, the references "a", "an", and "the" are generally inclusive of the plurals of the respective terms. For example, reference to "a compound" or "a method" includes a plurality of such "compounds" or "methods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context.

The terms "comprising" or "including" are intended to include embodiments encompassed by the terms "consisting essentially of" and "consisting of". Similarly, the term "consisting essentially of" is intended to include embodiments encompassed by the term "consisting of".

The methods and compositions and other advances disclosed here are not limited to particular methodology, protocols, and reagents described herein because, as the skilled artisan will appreciate, they may vary. Further, the terminology used herein is for describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by applicable law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

According to a first aspect, provided herein are systems and methods for creating and sharing user-generated information. FIG. 1 illustrates a schematic of the system.

In one embodiment the system comprises a multi-node peer-to-peer sharing module. The sharing module preferably provides windows for accessing, actuating, and using the system. The sharing module can provide tools and mechanisms for accessing, actuating, and using the system. The sharing module in one embodiment provides unique identities for various nodes or various users of the system. The sharing module preferably provides communication channels between various nodes and various peers using the system. The sharing module in one embodiment provides a first interfacing mechanism for interfacing with various other embodiments, means, mechanisms, and modules of the system and optionally a second interfacing mechanism. In certain embodiments the second interfacing mechanism is adapted for interfacing with various other systems, devices, means, mechanisms, and modules outside of the system.

In accordance with another embodiment, the system further comprises a user-window tool (UWT) adapted to provide an authorized or registered user with access to the system is provided herein. The user-window is preferably a customizable user window. Each user-window tool is preferably comprised of a template. The template in various embodiments further comprises tabs (T) and mechanisms (M) to add or delete tabs on the tool. The tabs can relate to e.g. an URL bar for accessing or pointing to at least one existing URL of a website or a web-page on the Internet. Further, the tabs may relate to an address pointer for accessing or pointing to at least one existing location on a closed network. Still further, the tabs may relate to an address pointer for accessing or pointing to at least one location on a network provided by the system. Preferably the further means, mechanisms, modules of the system can be activated or used in relation to at least one tab at least an existing URL or address pointer.

In another embodiment, the template is a fluid template, e.g., wherein the positioning of tabs is dynamic and selected and placed by the user. For example, the user may choose the location, style, etc. of the tabs within the template via the user-window tool. The user-window tool preferably further includes selection means (SM) in order to select at least one tab from a plurality of tabs defined in the system. The selected tab may be a tab that is preferentially displayed to a viewer. The plurality of tabs may include uploading means adapted to upload files or data, highlighting means, sharing means, pointing means, colour-coding means, tagging means, application adding means, note making means, language translation means, audio means, video means, multimedia means, presentation means, activity-enabling means in relation to the variety of data that can be shared or tagged, or the like.

In use of the system, a user preferably invokes the user-window tool and a blank template is invoked during initialization. The user may, then, place various means (and buttons provisioning those means) in the template as and how required. These are saved by the system, unless the user intends to change it. Next, the user typically selects an URL or an address pointer, or the user-window tool grabs the currently opened or active URL or address pointer from a computing system through which the system and the user-window tool is invoked. Typically, there is an authenticated log-in protocol and procedure to allow a user to invoke a personal user-window tool from any network connected computing device using the system. The user-defined user-window tool can be accessed from any system logged-in user-window tool. The user may, then, invoke the various means, mechanisms, modules, of the user-window tool in relation to the selected URL data or address pointer data in order to use the functionalities of the various means, mechanisms, modules, of the user-window tool on the URL data or address pointer data.

The user-window tool is a part of a client component (100) of the system. The user-window tool enables a user to generate content ("user generated content").

In one embodiment the tabs are custom tabs. Typically, the tabs can be arranged and rearranged on the template of the user-window tool according to user's choice. In various embodiments, the tabs may include a main tab and subsequent sub-tabs in relation to sub-activities or sub-functionalities provisioned by the main activity or main functionality of the main tab.

In one embodiment the user-window tool comprises a display means (DM) adapted to display the user-generated content in a window.

In accordance with another embodiment, a replication means (RM) adapted to replicate data from the site or page of a selected URL or data from the site or page of an address pointer is provided.

The system preferably further comprises a remote data structure, such as a database adapted to store replicated data. The data and/or meta data of each site or page that is selected is replicated in one embodiment such that a visual and/or functional duplicate is created on the server. Alternatively, the server may store sufficient information to allow a viewer's computer or browser to display a recreation of the site or page.

A remotely located server is preferably part of a server component (200) of the system. The server component generally includes a plurality of interrelated data structures or databases. For example, a first database (D1) may be used to store replicated data, information, metadata of the site or page. A second database (D2) may be used to store user identities and correlated log-in details. A third database (D3) may be used to store user identity based tagged user-created or user-tagged information, and so on. There may be n databases (Dn).

In accordance with another embodiment, the server component comprises a processing means (PM) adapted to process functionalities received from said user-window tool in relation with content to be generated, data resident on the databases, and the like.

In accordance with another embodiment, there is provided an uploading means (UM) adapted to allow a user to upload any type of file. The uploaded file is preferably resident on databases at a server component.

In accordance with another embodiment, this disclosure provides a tagging means (TG) adapted to tag user-generated information to the replicated data. "Tagging" generally refers to highlighting portions of data, commenting on portions of data, uploading data or files in relation to specific portion of data in a tagged or hyperlinked or pop-up manner. The tagging means can be invoked by means of tabs of the user-window tool. The system provides tagging of any type of information or file to any type of file or information. Each of these any types of information or files is stored as data located at the remotely located server component.

According to a non-limiting exemplary embodiment, a webpage may be tagged with a video file uploaded by the user. According to another non-limiting exemplary embodiment, a webpage may be tagged with notes or comments prepared by a user. According to yet another non-limiting exemplary embodiment, an Internet-based video file may be tagged with user content or comments or any other file or data.

In accordance with another embodiment, a bi-directional communication channel (CC) between one or more user-window tools of the system is provided. The communication is preferably routed, directly or indirectly, through the server component. This allows users of the user-window tools to communicate with each other in an online or offline manner. In one embodiment, sharing of content or data generated by one user can be facilitated through the bi-directional communication channel.

In accordance with yet another embodiment, there is provided a privacy control mechanism (PCM) adapted to induce privacy control settings at various levels for the user of the user-window tool. The privacy control mechanism includes first level of settings adapted to be invoked at one level for general access so as to form a group of contacts or groups of groups of contacts. Further, the privacy control mechanism includes second level of settings adapted to be invoked for each tab so as to allow sharing of functionality provisioned by the tab to selected users from users selected by the first level of privacy control settings. Still further, the privacy control mechanism includes third level of settings adapted to be invoked for each item so as to allow sharing of item created by a user to selected users from users selected by the first level of privacy control settings. Such multi-layer privacy settings and its permutations and combinations for selective access to users is provisioned in the system.

In accordance with another embodiment, there is provided an embedding means (EM) adapted to embed information in already existing data on the Internet. The embedding is done in connection with the replicated data. According to a non-limiting exemplary embodiment, a video uploaded on YOUTUBE will be replicated on to the server and at a particular time slot, a data file or a picture file may be embedded so that other users may be able to see the data file or picture file at the particular time slot of the video when it is played.

In accordance with another embodiment, there is provided a link validation mechanism adapted to validate each link associated with content or keyword on a web-page or a website. Whenever, a user accesses a webpage that has a link reference which is invoked by the system, it is necessary to identify, highlight, and display correct validated link. Each webpage or website involves a document tree which comprises a path of the content or keyword with the associated link. If the tree structure changes, even minimally, the link is broken and the link is invalid. Therefore, the link validation mechanism is adapted to track changes in tree structure and duplicates the changes wherever required. Further, the link validation mechanism is adapted to check each link, end-to-end, to ensure valid working Failure of any link or a broken link is referenced and recorded.

In accordance with yet another embodiment, there is provided a SMS (Short Message Service) based mobile device application (MBA) adapted to allow a user to share user user-generated content. It also allows a user to generate user-generated content. Typically, the SMS (Short Message Service) based mobile device application comprises means to convert a smart tap to a pointer for using the application. Further, the application comprises a similar user-window tool enable to be working with the mobile device application. The user-window tool of The mobile device application comprises a SMS transmitting tool adapted to send an SMS to a listed or unlisted user or another mobile device (with or without the mobile device application). The user-window tool of The mobile device application further comprises layered previews of user-generated content, the layers being provisioned by a level of transparency of display. The user-window tool of The mobile device application still further comprises fetching means to fetch the user-generated content on to the mobile device through the user-window tool of the mobile device application. The user-window tool of the mobile device application further comprises a communication means and/or sharing means adapted to communicate and/or share, with various users, through the server.

According to a non-limiting exemplary method of use of the SMS (Short Message Service) based mobile device application, the following steps are, preferably, followed:

1) A registered user invokes the application;
2) The user generates user-generated content on the mobile device through the user-window tool and various data or files or using the input means of the mobile device. Privacy control settings may be incorporated;
3) The user sends a SMS to another registered or unregistered user;
4) If the other user is unregistered, the SMS is tweaked to incorporate a URL to download the mobile device application;
5) If the other user is registered, the user uses a smart tap to access the user-generated content;
6) The recipient user may preview the user-generated content, wherein various layers of content are visible in various layers of transparency. A pointer hover over any layer may enable appropriate reading of the content; and
7) Sender user and recipient user can communicate through the user-window tool of the mobile device application.

In accordance with another embodiment, there is provided an encryption mechanism adapted to include phone identity plus MAC (Media Access Control) identity of each user and store it on databases at the server.

Although, the above specification mentions the use of existing data on websites or web-pages, the user-window tool can also be used to create user-defined sites or pages. Such sites or pages can be stored, e.g. on a remotely located server. Addresses of these sites or pages may be defined by the system.

According to a non-limiting exemplary method of use of the system, the following steps are, preferably, followed:

1) User invokes user-window tool;
2) User selects various tabs and places them on the template of the user-window tool;
3) User accesses a URL or an address pointer using the user-window tool so that a site or page opens;

4) User uses tabs to perform actions on the opened site or page, the actions may relate to highlighting portions of text, adding comments, uploading files, tagging content, and the like;

5) Server component, simultaneously, replicates a copy of the opened site or page so that user actions are actually carried out on the replicated site or page on the server, and not on the originally hosted site or page;

6) User enables privacy control settings at various levels;

7) User adds other users in various groups on the user-window tool;

8) User shares user-generated content with desired other users; and

9) Recipient users are able to see, modify, change, comment, tag, the user-generated content of the sender and share it further with their own privacy control settings.

The data, in each of the means of the system and method, may be 'encrypted' and suitably 'decrypted' when required. Further, the data may be stored or processed or exchanged in encrypted or coded or encoded or scrambled or translated or ciphered form.

The systems of the present invention in one embodiment are made accessible through a portal or an interface which is a part of, or may be connected to, the Internet or World Wide Web or any similar portal, wherein the portals or interfaces are accessed by one or more of users through an electronic device, whereby the user may send and receive data to the portal or interface which gets stored in at least one memory device or at least one data storage device or at least one server, and utilizes at least one processing unit. The portal or interface in combination with one or more of memory device, data storage device, processing unit and serves, form an embedded computing setup, and may be used by, or used in, one or more of a computer program product. In one embodiment, the embedded computing setup and optionally one or more of a computer program product, in relation with, and in combination with the said portal or interface forms one of the systems. Typical examples of a portal or interface may be selected from but is not limited to a website, an executable software program or a software application.

In one embodiment, the systems and methods may simultaneously involve more than one user and/or more than one data storage device and/or more than one host server or any combination thereof.

In one embodiment, a user may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, a motion-sensitive input for detecting hand, eye, or body motion, and the like.

In one embodiment, the systems and methods can be practised using any electronic device which may be connected to one or more of other electronic device with wires or wirelessly which may use technologies such as but not limited to, Bluetooth, WiFi, Wimax. This will also extend to use of the aforesaid technologies to provide an authentication key or access key or electronic device based unique key or any combination thereof.

In one embodiment, the systems and methods can be practised using any electronic device or mobile device or computing device or smart phone device or IP-enabled device.

In one embodiment, the system may involve software updates or software extensions or additional software applications.

In one embodiment, any form of internet security such as but not limited to, a firewall or antivirus or antimalware or registry protection can be used by a user in the same or different electronic device either simultaneously or separately, along with the systems or methods of the present invention.

In one embodiment, one or more users can be blocked or denied access to one or more of the aspects.

The described embodiments may be implemented as a system, method, apparatus or article of manufacture (e.g. computer readable medium) using standard programming and/or engineering techniques related to software, firmware, hardware, or any combination thereof. The described operations may be implemented as code maintained in a computer readable medium, where a processor may read and execute the code from the computer readable medium.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. A device in which the code implementing the described embodiments of operations is encoded may comprise a computer readable medium or hardware logic.

In one embodiment, the systems and methods can be practised using any electronic device. An electronic device for purposes herein may comprise any device capable of processing or representing data to a user and providing access to a network or any system similar to the Internet. In various embodiments, the electronic device may comprise, e.g. a personal computer, smart phone, laptop, hand-held device, tablet, portable media player or personal digital assistant.

In one embodiment computer program code for carrying out operations or functions or logic or algorithms for aspects hereof may be written in any combination of one or more programming languages which are either already in use or may be developed in future, such as but not limited to Java, Smalltalk, C++, C, Foxpro, Basic, HTML, PHP, SQL, Javascript, COBOL, Extensible Markup Language (XML), Pascal, Python, Ruby, Visual Basic.NET, Visual C++, Visual C#.Net, Python, Delphi, VBA, Visual C++.Net, Visual FoxPro, YAFL, XOTcl, XML, Wirth, Water, Visual DialogScript, VHDL, Verilog, UML, Turing, TRAC, TOM, Tempo, Tcl-Tk, T3X, Squeak, Specification, Snobol, Smalltalk, S-Lang, Sisal, Simula, SGML, SETL, Self, Scripting, Scheme, Sather, SAS, Ruby, RPG, Rigal, Rexx, Regular Expressions, Reflective, REBOL, Prototype-based, Proteus, Prolog, Prograph, Procedural, PowerBuilder, Postscript, POP-11, PL-SQL, Pliant, PL, Pike, Perl, Parallel, Oz, Open Source, Occam, Obliq, Object-Oriented, Objective-C, Objective Caml, Obfuscated, Oberon, Mumps, Multiparadigm, Modula-3, Modula-2, ML, Miva, Miranda, Mercury, MATLAB, Markup, m4, Lua, Logo, Logic-based, Lisp (351), Limbo, Leda, Language-OS Hybrids, Lagoona, LabVIEW, Interpreted, Interface, Intercal, Imperative, IDL, Icl, ICI, HyperCard, HTMLScript, Haskell, Hardware Description, Goedel, Garbage Collected, Functional, Frontier, Fortran, Forth, Euphoria, Erlang, ElastiC, Eiffel, E, Dylan, DOS Batch, Directories, Declarative, Dataflow, Database, D, Curl, C-Sharp, Constraint, Concurrent, Component Pascal, Compiled, Comparison and Review, Cocoa, CobolScript, CLU, Clipper, Clean, Clarion, CHILL, Cecil, Caml, Blue, Bistro, Bigwig, BETA, Befunge, BASIC, Awk, Assembly, ASP, AppleScript, APL, Algol 88, Algol 60, Aleph, ADL, ABEL, ABC, or programming languages, known or hereafter developed.

In one embodiment, the data storage unit or data storage device comprises but is not limited to one or more of a USB flash drive (pen drive), memory card, optical data storage discs, hard disk drive, magnetic disk, magnetic tape data storage device, data server, or molecular memory, or any combination thereof.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

In the specification, there have been disclosed several embodiments, some of which may be typical and/or preferred at the present time. Although specific terms are employed, they are used in a generic and descriptive sense only and not for purposes of limitation. The scope of the invention is set forth in the claims. Obviously many modifications and variations are possible in light of the above teachings. It is therefore to be understood that within the scope of the appended claims the invention may be practiced otherwise than as specifically described.

What is claimed is:

1. A method for user-generated information creation and sharing, said method comprising the steps of: providing at least one communication channel between multiple nodes and/or multiple peers using a multi-node peer-to-peer sharing module; allowing a user to upload a file from a local system and subsequently storing the file in a database on a server, thereby forming a content library, per node or per user; allowing a user to tag a file from said content library with respect to a webpage or other files from said content library to form user-generated information; providing an authorised or registered user with access to said content library using a user-window tool enabling a user to generate user-generated content; and validating each link or each tag associated with content or keyword(s) on a webpage using a link validation mechanism, said validating comprising reading and archiving data or content of a webpage tagged by the user; updating archived data; comparing archived data and its corresponding relative location with updated data and its corresponding relative location to provide at least a comparison score; and computing an integrity score based on a plurality of comparison scores for the webpage; wherein the reading step comprises reading at least a textual content of a tagged webpage, reading at least a graphical content of a tagged webpage, or reading at least an entire page that is tagged in either OCR format, image format, or both.

2. The method of claim 1 further comprising the step of fetching a user-generated content library from any virtual node connected to the system.

3. The method of claim 1 wherein the step of allowing the user to tag a file comprises highlighting portions of data, commenting on portions of data, or uploading data or files in relation to specific portion of data in a tagged, hyperlinked, or pop-up manner.

4. The method of claim 1 wherein the step of allowing the user to tag a file comprises multiple tagging for same data, or tagging coupled with privacy control to allow multiple privacy control settings or different privacy control setting for the same tag.

5. The method of claim 1 wherein the step of providing an authorised or registered user with access to said content library comprises using a customizable user window.

6. The method of claim 1 wherein the step of providing an authorised or registered user with access to said content library comprises using a customizable user window having a template comprising tabs that can he added to or deleted therefrom.

* * * * *